United States Patent
Kato

(10) Patent No.: US 8,384,910 B2
(45) Date of Patent: Feb. 26, 2013

(54) DOUBLE PASS INTERFEROMETER WITH TILTED MIRRORS

(75) Inventor: Shigeki Kato, Shimotsuke (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 12/437,770

(22) Filed: May 8, 2009

(65) Prior Publication Data

US 2009/0284750 A1 Nov. 19, 2009

(30) Foreign Application Priority Data

May 13, 2008 (JP) ................................. 2008-125655

(51) Int. Cl.
*G01B 11/02* (2006.01)
(52) U.S. Cl. ...................................................... 356/498
(58) Field of Classification Search .................. 356/486, 356/493, 498
See application file for complete search history.

(56) References Cited

U.S. PATENT DOCUMENTS

| | | | |
|---|---|---|---|
| 6,762,845 B2 * | 7/2004 | Hill | 356/520 |
| 6,897,962 B2 * | 5/2005 | Johnstone et al. | 356/493 |
| 7,379,190 B2 * | 5/2008 | Hill | 356/509 |
| 7,391,521 B2 | 6/2008 | Ishizuka | |
| 2003/0007156 A1 | 1/2003 | De Groot | |
| 2005/0110971 A1 | 5/2005 | Maria Beems | |
| 2007/0223005 A1 | 9/2007 | Lee | |

FOREIGN PATENT DOCUMENTS

JP 2006-112974 A 4/2006

* cited by examiner

*Primary Examiner* — Tarifur Chowdhury
*Assistant Examiner* — Jonathon Cook
(74) *Attorney, Agent, or Firm* — Canon USA Inc IP Division

(57) ABSTRACT

An interferometer of the present invention includes a PBS2 which splits light into reference light and measurement light, a reference mirror 4a which reflects the reference light entering the reference mirror from a first direction, a measurement mirror 4b which reflects the measurement light entering the measurement mirror from a second direction, a lens system 6 which reflected lights from the reference mirror 4a and the measurement light 4b enter, a reflective device 5 which reflects light from the lens system 6, and a light receiving device 16 which receives multiplexed light, wherein the reference mirror 4a and the measurement mirror 4b are in a conjugate relation with respect to the reflective device 5, and at least one of the reference mirror 4a and the measurement mirror 4b is tilted so that its normal direction differs from the first and the second direction.

7 Claims, 4 Drawing Sheets

IDEAL INTERFERENCE SIGNAL

INTERFERENCE SIGNAL
ON WHICH 1/2 $\lambda$ PERIODIC ERROR IS SUPERIMPOSED

DOUBLE PASS INTERFEROMETER WITH TILTED MIRRORS

BACKGROUND OF THE INVENTION

1. Field of the Invention

The present invention relates to an interferometer, and more particularly to a double pass interferometer which obtains displacement information of an object to be measured from lights which have been reflected twice on a reference mirror and a measurement mirror, respectively.

2. Description of the Related Art

Conventionally, as an apparatus which measures a displacement of an object, controls a stage, or performs a various kind of length measurements, a laser interferometer has been used because of the features of the high accuracy and high resolution. For example, Japanese Patent Laid-Open No. 2006-112974 discloses a position detecting apparatus which detects a position displacement of an object using an interference length measurement by non-contact.

FIG. 3 is a configuration diagram of a conventional interferometer. A laser beam 110 having a wavelength of $\lambda$ ($\lambda$=633 nm) emitted from a light source 10 enters a PBS 20 (a polarizing beam splitter) and is split into reference light 120a and measurement light 120b on the PBS surface 20p. The reference light 120a is reflected on the reference mirror 40a and enters the PBS 20 again by passing through the previous optical path. In this case, A P wave is converted to an S wave by being transmitted through a ¼ $\lambda$ plate 30a twice. Therefore, it is transmitted through the PBS surface 20p to be reference light 130a and enter a reflective device 50.

On the other hand, the measurement light 120b is reflected on a measurement mirror 40b and passes through a previous optical path to enter the PBS 20 again. In this case, because a light beam of the measurement light 120b is transmitted through a ¼ $\lambda$ plate 30b twice and an S wave is converted to a P wave, it is reflected on the PBS surface 20p to be a light beam 130b and, similarly to the reference light 130a, enter the reflective device 50.

After that, the reference light 130a is transmitted through the PBS 20 again to be reference light 140a, and the measurement light 130b is reflected on the PBS 20 again to be measurement light 140b. The reference light 140a and the measurement light 140b are transmitted through the ¼ $\lambda$ plates 30a and 30b twice, respectively. The reference light 140a and the measurement light 140b entered the PBS 20 again are multiplexed to be multiplexed light 150. An interference signal having a period of ¼ $\lambda$ in accordance with a displacement of the measurement mirror 40b can be obtained by receiving the multiplexed light 150 by a light receiving device 160.

As shown in FIG. 3, in a conventional typical interferometer, there are a lot of reflective surfaces in the optical path. A component reflected on an interface 210b passes through the same optical path as that of the ordinary measurement light and is finally superimposed on the multiplexed light 150. Although this reflective component is modulated by the movement of the measurement mirror 40b, it reaches the measurement mirror 40b by only one reflection. The same is true for interfaces 210a, 210aa, and 210bb. Therefore, a modulation amount is a half of an ordinary reflective component and is obtained as an interference signal (a ghost light signal) having a period of ½ $\lambda$.

For example, when a reflectance of an AR coat (an antireflective coating film) on the interface 210b is 0.2%, the interference signal generated by the ghost light which has been reflected on the interface 210b has an interference intensity of no less than around 9%, compared wave-optically to the interference intensity of a primary signal. Even if an ultralow reflective AR coat having a reflectance of 0.01% is adopted, the interference intensity is 2.5%.

FIG. 4A is a waveform of an ideal interference signal, and FIG. 4B is a waveform of an interference signal on which a ½ $\lambda$ periodic error is superimposed. The interference signal shown in FIG. 4B is a periodic signal including an error caused by ghost light of a double pass interferometer.

On the electric signal outputted from the light receiving device 160, a sine wave signal caused by all ghost lights is superimposed. Therefore, the interference signal obtained by the conventional interferometer has a waveform as shown in FIG. 4B.

FIG. 5 is a diagram showing a relationship between an output of a light receiving device (a sensor displacement output) and a displacement of an object to be measured.

Commonly, sub-nanometer resolution can be obtained by electrically dividing the sine wave periodic signal modulated in accordance with the displacement of the object to be measured. However, if a component caused by the ghost light is superimposed, as shown in FIG. 5, the linearity of the sensor displacement output with respect to the displacement of the object to be measured is deteriorated. In other words, an interpolation error is included between the sensor displacement output and the displacement of the object to be measured. Because this error amount reaches several nanometers to tens of nanometers, it is a big problem in the interferometer used for the application requiring ultrahigh accuracy

BRIEF SUMMARY OF THE INVENTION

The present invention provides a high-accuracy interferometer which suppresses an effect of ghost light.

An interferometer as one aspect of the present invention includes a light splitting device configured to split light from a light source apparatus into reference light and measurement light, a reference mirror configured to reflect the reference light which has been split by the light splitting device and enters the reference mirror from a first direction, a measurement mirror configured to reflect the measurement light which has been split by the light splitting device and enters the measurement mirror from a second direction, an optical system configured so that reflected lights from the reference mirror and the measurement mirror enters the optical system via the light splitting device, a reflective device configured to reflect lights from the optical system in order to irradiate corresponding one of the reflected lights on corresponding one of the reference mirror and the measurement mirror again, respectively, and a light receiving device configured to receive lights which have been multiplexed after irradiating corresponding one of lights twice on corresponding one of the reference mirror and the measurement mirror, respectively. The reference mirror and the measurement mirror are in a conjugate relation with respect to the reflective device, and at least one of the reference mirror and the measurement mirror is tilted so that a normal direction of at least one of the reference mirror and the measurement mirror differs from the first and the second direction.

Further features and aspects of the present invention will become apparent from the following description of exemplary embodiments with reference to the attached drawings.

DETAILED DESCRIPTION OF THE PREFERRED EMBODIMENTS

Figure 1A:
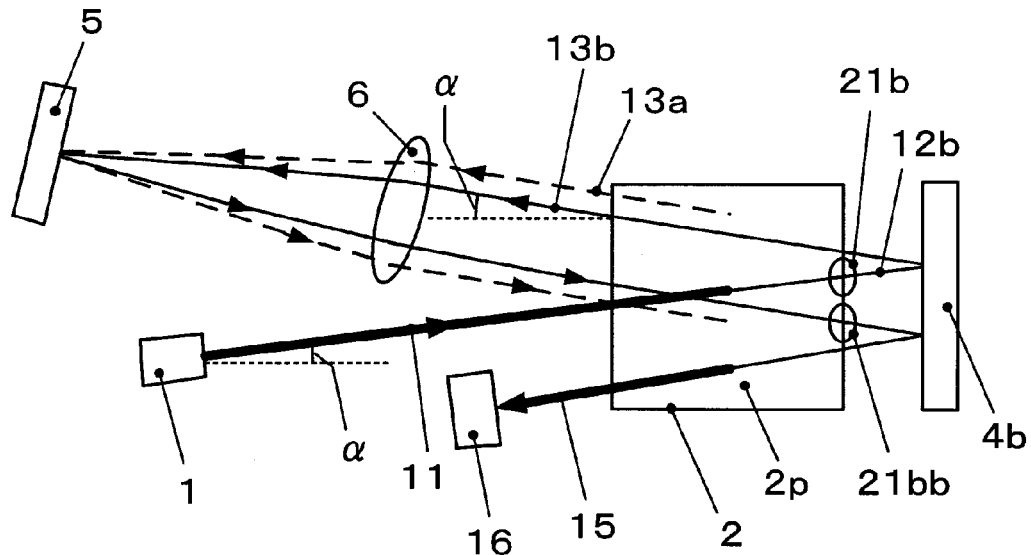
FIG. 1A is a top view showing a configuration of an interferometer in the present embodiment.

Exemplary embodiments of the present invention will be described below with reference to the accompanied drawings. In each of the drawings, the same elements will be denoted by the same reference numerals and the duplicate descriptions thereof will be omitted.

An interferometer of the present embodiment detects displacement information of an object (an object to be measured) as phase information of light, and it obtains the displacement information of the object by converting the phase information of the light into an electric signal.

Figure 1B:
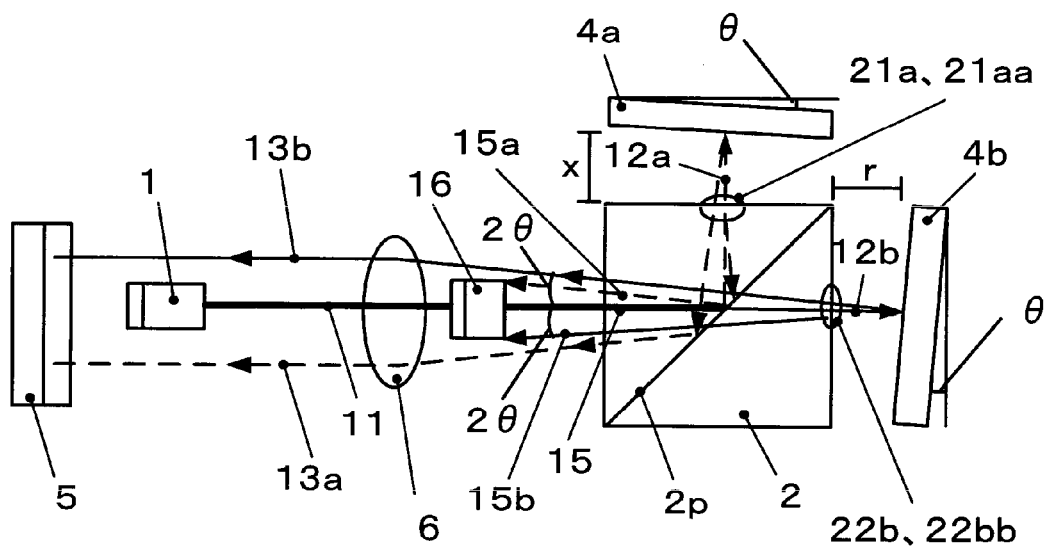
FIG. 1B is an elevation view showing a configuration of an interferometer in the present embodiment.

FIG. 1A is a top view showing a configuration of an interferometer in the present embodiment. FIG. 1B is an elevation view showing a configuration of the interferometer in the present embodiment.

Reference numeral 1 denotes a light source (a light source apparatus). The light source 1 emits laser light 11 (collimated light beam) which has a wavelength of λ (λ=633 nm). The wavelength λ of the laser light 11 is not limited to this, but the light source may emit a laser light which has a different wavelength.

Reference numeral 2 denotes a PBS (a polarizing beam splitter). The PBS 2 is a light splitting device which splits a light beam into two beams in accordance with a polarization component of incident light. In the top view of FIG. 1A, the laser light 11 emitted from the light source 1 enters the PBS 2 at an angle α, for example α=5°. The PBS 2 has a PBS surface 2p (a polarizing beam splitter surface), and the incident light on the PBS 2 is split into reference light 12a and measurement light 12b on the PBS surface 2p. The top view of FIG. 1A views a plane of the PBS surface 2a, and the elevation view of FIG. 1B views a cross section of the PBS surface 2p.

Reference numerals 4a and 4b denote a reference mirror and a measurement mirror, respectively. Partial light of the incident light from the light source 1 to the PBS 2 is reflected in a first direction on the PBS surface 2p, and enters the reference mirror 4a as a reference light 12a. The other partial light of the incident light to the PBS 2 is transmitted through the PBS surface 2p, and enters the measurement mirror 4b from a second direction as a measurement light 12b. As shown in FIG. 1B, the reference mirror 4a reflects the reference light 12a which is split by the PBS 2 and enters from the first direction. Similarly, the measurement mirror 4b reflects the measurement light 12b which is split by the PBS 2 and enters from the second direction. The measurement mirror 4b is attached to an object to be measured. When the measurement mirror 4b (the object to be measured) is displaced in an optical axis direction (the second direction), the phase information of the measurement light 12b changes. The reference mirror 4a and the measurement mirror 4b are in a conjugate relation with a reflective device 5 described later.

The reference mirror 4a is arranged with a tilt at an angle θ so that a normal direction of its mirror surface differs from an optical axis direction (a first direction) of the reference light 12a reflected on the PBS surface 2p. Similarly, the measurement mirror 4b is arranged with a tilt at an angle θ so that a normal direction of its mirror surface differs from an optical axis direction (a second direction) of the measurement light 12b transmitted through the PBS surface 2p. In the present embodiment, for example the angle θ is set to 0.5°. In the description of the present embodiment, when viewed from the elevation view of FIG. 1B, the angle θ is an angle between the first direction and the normal direction of the reference mirror surface, and an angle between the second direction and the normal direction of the measurement mirror surface.

Therefore, reference light 13a after reflected on the reference mirror 4a is a light beam with a tilt at an angle 2θ with respect to the reference light 12a before entering the reference mirror 4a. Similarly, measurement light 13b after reflected on the measurement mirror 4b is a light beam with a tilt at an angle 2θ with respect to the measurement light 12b before entering the measurement mirror 4b.

Reference numeral 6 denotes a lens system (an optical system). The reference light 13a reflected on the reference mirror 4a is reflected on the PBS surface 2p and enters the lens system 6 at an angle 2θ. Similarly, the measurement light 13b reflected on the reference mirror 4b is transmitted through the PBS surface 2p and enters the lens system 6 at an angle 2θ. Thus, the lens system 6 (the optical system) is configured so that the reflected light (the reference light 13a) from the reference mirror 4a and the reflected light (the measurement light 13b) from the measurement mirror 4b enter it via the PBS 2. As shown in the elevation view of FIG. 1B, the lens system 6 deflects the reference light 13a and the measurement light 13b which have entered it at the angle 2θ to an original angle, i.e. a direction parallel to the direction of the laser light 11 from the light source 1.

In the present embodiment, the lens system 6 is used as an optical system that the reference light 13a and the measurement light 13b enter, but the embodiment is not limited to this. Instead of the lens system 6, a reflective system can also be used.

In the embodiment, the reference mirror 4a and the measurement mirror 4b are positioned so that each passing position of the reflected lights in the lens system 6 is symmetric with respect to a central axis of the lens system 6. In other words, as shown in FIG. 1B, both of the reference mirror 4a and the measurement mirror 4b are tilted at an angle θ in a clockwise direction from reference positions, respectively, and the height of each light beam of the reference light 13a and the measurement light 13b which enter the lens system 6 is configured to be symmetric between top and bottom.

The present embodiment is not to this, but the angle of the reference mirror 4a may be set to an angle differing from that of the measurement mirror 4b or these mirrors may be tilted in different directions from each other. In the embodiment, at least one of the reference mirror 4a and the measurement mirror 4b has only to be tilted. In this case, at least one of the normal directions of the reference mirror 4a and the measurement mirror 4b is tilted with respect to the first direction and the second direction.

Reference numeral 5 denotes a reflective device. The reference light 13a and the measurement light 13b which have entered the lens system 6 at an angle 2θ are, as shown in the elevation view of FIG. 1B, refracted by the lens system 6 to be parallel to each other. The reflective device 5 reflects the lights which is parallel to each other from the lens system 6 in order to irradiate the reflected lights from the reference mirror 4a and the measurement mirror 4b (the reference light 13a and the measurement light 13b) on the reference mirror 4a and the measurement mirror 4b again.

The reflective device 5 is in a conjugate relation with the reference mirror 4a and the measurement mirror 4b. Therefore, in the elevation view of FIG. 1B, the reference light 13a and the measurement light 13b are parallel to the laser light 11 from the light source 1, and are reflected by the reflective device 5 so as to maintain the angle. The light beam reflected by the reflective device 5 passes through the lens system 6 and the PBS 2 and is irradiated on either the reference mirror 4a or the measurement mirror 4b.

Reference numeral 16 denotes a light receiving device (a photo detector). The light receiving device 16 receives a multiplexed light 15 which has been multiplexed by being irradiated twice on each of the reference mirror 4a and the measurement mirror 4b. The multiplexed light 15 enters the light receiving device 16 at the same angle as that of the laser light 11.

Thus, the multiplexed light 15 (a primary light beam in a double pass interferometer) enters the light receiving device 16 at the same angle as that of the laser light 11. Therefore, it becomes an interference signal having a period of ¼λ at a maximum which repeats uniform blinking on the entire surface of the light receiving device 16.

Next, stray light (ghost light) which is generated by an interferometer of the present embodiment will be described.

In the present embodiment, the reference light 13a and the measurement light 13b that are light beams returned from the reflective device 5 will be considered. After the reference light 13a and the measurement light 13b enters the PBS 2, parts of the lights reflect on an AR coating surface (an antireflective coating surface) at each of interfaces 21aa and 21bb between the PBS 2 (the prism) and the air. The ghost lights 15a and 15b reflected on the AR coating surface of the interfaces 21aa and 21bb, similarly to a principal light beam (the reference light and the measurement light), enter the light receiving device 16 to generate an interference signal.

However, in the elevation view of FIG. 1B, each of the ghost lights 15a and 15b enters the light receiving device 16 at an angle which is made by tilting at an angle 2θ with respect to a direction of the multiplexed light 15. Therefore, an interference pattern with a predetermined pitch p is generated on a light receiving area (a light receiving surface) of the light receiving device 16. The pitch p of the interference pattern is represented by expression 1 using a wavelength λ and an angle θ.

$$p = \frac{\lambda}{\sin 2\theta} \quad (1)$$

Figure 2:
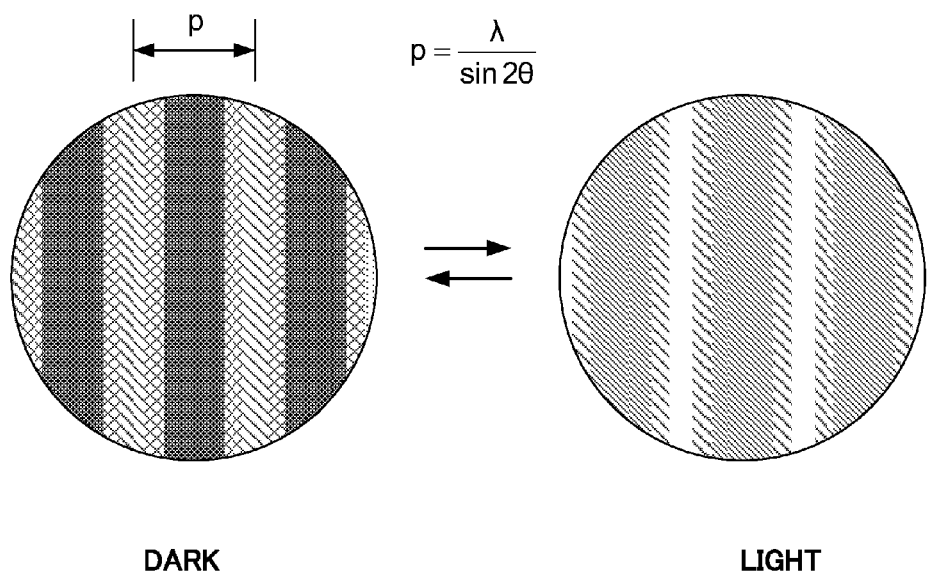
FIG. 2 is one example of an interference pattern which appears in a light receiving area of a light receiving device in the present embodiment.
Figure 3:
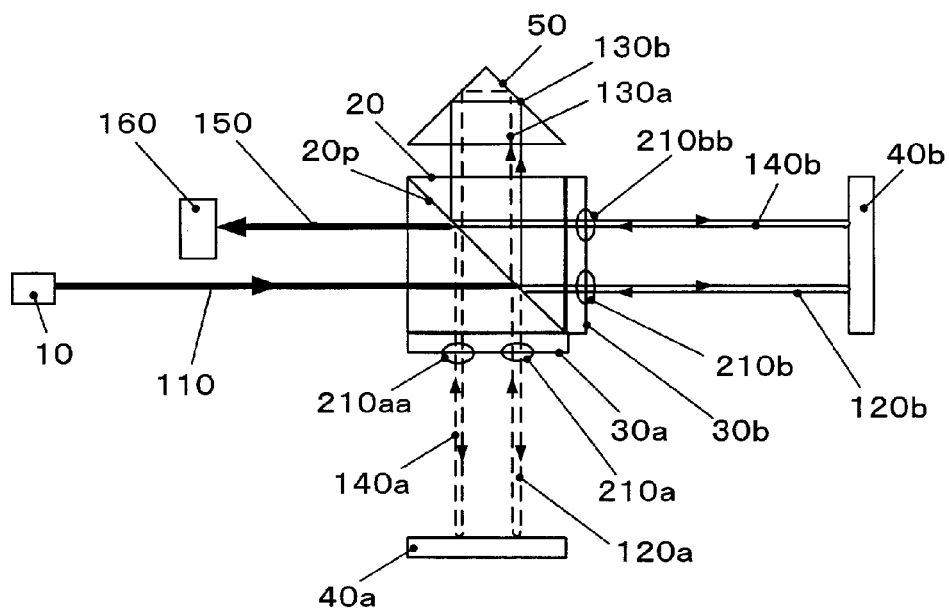
FIG. 3 is a configuration diagram of a conventional double pass interferometer.
Figure 4A:
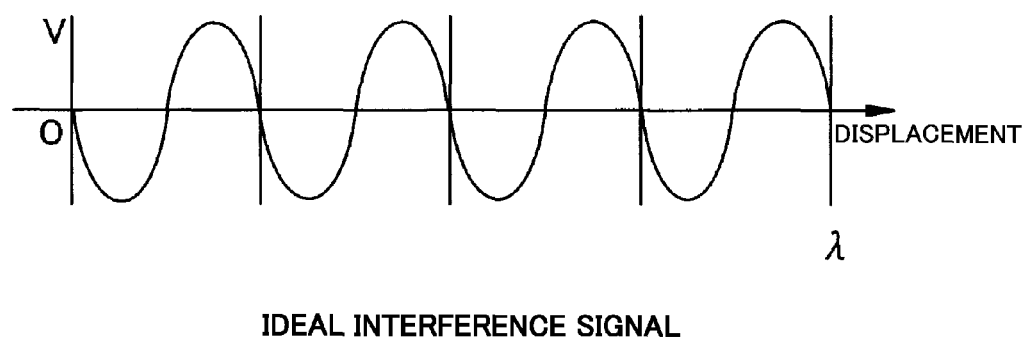
FIG. 4A is a waveform of an ideal interference signal.
Figure 4B:
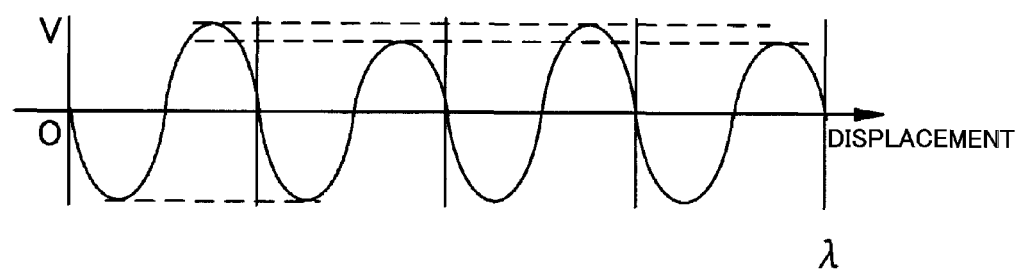
FIG. 4B is a waveform of an interference signal on which a ½λ periodic error is superimposed.
Figure 5:
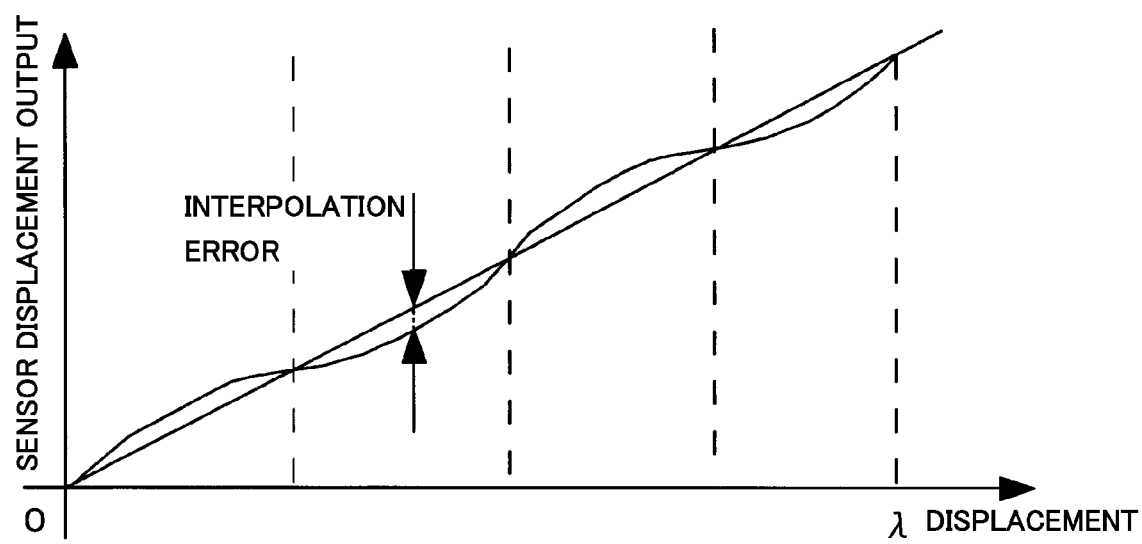
FIG. 5 is a diagram showing the relationship between a sensor displacement output and the displacement of an object to be measured in a conventional double pass interferometer.

FIG. 2 is one example of an interference pattern which appears in the light receiving area of the light receiving device 16. Both the "light" to the right side and the "dark" to the left side in FIG. 2 indicate an interference pattern which appears in the light receiving area of the light receiving device 16. The interference pattern which appears in the light receiving area repeats the "light" and the "dark" shown in FIG. 2 by the displacement of the measurement mirror 4b. This period depends on the wavelength λ, and for example, when the measurement mirror 4b is displaced by around 200 nm using light having the wavelength λ of 850 nm, the "light" changes to the "dark".

In the present embodiment, as shown in FIG. 2, the interference pattern having a pitch p represented by expression 1 can be obtained. The interference pattern is caused by the ghost light. Therefore, if the light receiving area of the light receiving device 16 is sufficiently large compared to the pitch p, an amount of the light detected by the light receiving device 16 is averaged (an averaging effect). Accordingly, an interpolation error can be sufficiently reduced and the linearity of the sensor displacement output can be improved.

For example, it is considered that the interference pattern of the ghost light 15a reflected on the interface 21aa is generated by the intensity of around 9% compared to the interference pattern intensity of the principal light beam, as described in the conventional art. In this case, when a diameter φ of the light receiving area is 2 mm and the tilt angle θ of each of the reference mirror 4a and the measurement mirror 4b is 0.5°, the interference pattern generated caused by the ghost light is a stripe pattern with a pitch p of 36 µm. The rate of the signal having a period of ½λ which is caused by the ghost light superimposed on an electric signal is only 0.16% of a main signal. Because this is a deterioration of only ±0.04 nm as linearity, the error can be reduced to the extent that there is no problem at all even if it is an ultra-high accurate length measurement of sub nanometer level. The same is true for the other interfaces 21b, 21bb, and 21a. Therefore, even if deterioration factors in all of these four interfaces are added, a periodic error of ±0.16 nm is only generated. Accordingly, the length measurement can be performed with extremely high accuracy.

In the present embodiment, when the light receiving area of the light receiving device 16 is a circle having a diameter D, the pitch p may be set so as to be shorter than the diameter D. On the other hand, since sin 2θ is equal to or less than 1, the pitch p is not shorter than a wavelength λ. Therefore, if the pitch p is set to the range represented by expression 2, an averaging effect can be improved in the present embodiment.

$$\lambda \le p = \frac{\lambda}{\sin 2\theta} < D \quad (2)$$

Furthermore, when a distance x between the reference mirror 4a and the PBS 2 is equal to a distance r between the measurement mirror 4b and the PBS 2, a wave optically equivalent optical path position of the reference light and the measurement light is obtained. Therefore, the optical path length of light passing through the glass optical path matches the optical path length of light passing through the air.

Therefore, a stable measurement can be performed in the long term without being influenced by the state change of the atmosphere relating to an air refractive index such as atmospheric pressure, temperature, or humidity.

When the amplitude is averaged in a state where the diameter D of the light receiving area is equal to or more than 0.5 mm, the wavelength of the light source is 850 nm, and the number of the patterns in the light receiving surface is equal to or more than 0.5, it is preferable that the tilt angle θ of each of the reference mirror 4a and the measurement mirror 4b in the present embodiment is set to be equal to or more than 0.1°. In a conventional interferometer which was made so as not to tilt a reference mirror or a measurement mirror, it is predicted that the error of the tilt angle is equal to or less than 0.1° and the effect of the present invention can not be obtained.

The light source apparatus (the light source 1) in the present embodiment is an apparatus which generates collimated light, but is not limited to this. For example, even when a divergent light source is used instead of the light source generating the collimated light, the same effect as that of the light source 1 can be obtained by using a lens system as a collimate unit which collimates a divergent light beam. In this case, the same effect as that of the light source 1 can be obtained with a simple configuration by integrating the lens system as the collimate unit and the lens system 6, i.e. by constituting the lens system 6 as a part of the light source apparatus. In this case, the light from the divergent light source is changed to collimated light by the lens system 6 and enters the PBS 2.

According to the interferometer of the present embodiment, the reference mirror and/or the measurement mirror is set so as to be always tilted. Therefore, the ghost lights which have been reflected once on the reference mirror and once on the measurement mirror are multiplexed at an angle different from that of the light beams which have been reflected twice on the reference mirror and twice on the measurement mirror. Therefore, a lot of interference patterns (interference stripes) appear and are averaged on the light receiving device, and the error amount is considerably improved. Furthermore, the primary light beams which have been reflected twice on the reference mirror and twice on the measurement mirror are multiplexed at the same angle each other. Therefore, a uniform interference state is formed and the maximum interference intensity can be obtained.

Therefore, according to the present embodiment, a high-accuracy interferometer which suppresses the influence of ghost light can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, a Michelson interferometer has been described in the present embodiment, but is not limited to this. The present embodiment is also applicable to other interferometers such as a Fizeau interferometer.

This application claims the benefit of Japanese Patent Application No. 2008-125655, filed on May 13, 2008, which is hereby incorporated by reference herein in its entirety.

What is claimed is:

1. An interferometer comprising:
    a light splitting device configured to split light from a light source into a reference light and a measurement light;
    a reference mirror configured to reflect the reference light which has been split by the light splitting device and enters the reference mirror from a first direction;
    a measurement mirror configured to reflect the measurement light which has been split by the light splitting device and enters the measurement mirror from a second direction;
    an optical system configured so that reflected lights from the reference mirror and the measurement mirror enter the optical system via the light splitting device;
    a reflective device configured to reflect lights from the optical system to irradiate the reference mirror and the measurement mirror with the reflected lights through the optical system, respectively; and
    a light receiving device configured to receive light which have been formed by interference between two lights reflected twice at the reference mirror and the measurement mirror, respectively,
    wherein the reference mirror and the measurement mirror are tilted so that normal directions of the reference mirror and the measurement mirror differ from the first and the second directions, respectively, and the measurement mirror is configured to be displaced along the second direction so that the reference mirror is in a positional relation with the measurement mirror, the optical system having an optical power, other than zero, that causes, in the positional relation, the reflected lights from the reference mirror and the measurement mirror, passed therethrough, to be parallel with each other, and the reflective device being configured to reflect the lights, in the positional relation, backward on respective paths, on which the lights have respectively traveled from the optical system.

2. An interferometer according to claim 1, wherein the optical system is configured to deflects the reflected lights from the reference mirror and the measurement mirror to a direction parallel to a direction of the light from the light source.

3. An interferometer according to claim 1, wherein the light source is configured to emit a collimated light.

4. An interferometer according to claim 1, wherein the reference mirror and the measurement mirror are tilted so that passing positions of the reflected lights in the optical system are symmetric with each other with respect to a central axis of the optical system.

5. An interferometer according to claim 1, wherein the interferometer is configured so that a pitch of an interference pattern which appears in a light receiving area of the light receiving device is smaller than a diameter of the light receiving area.

6. An interferometer according to claim 1, wherein the optical system includes one of a refractive element having the optical power and a reflective element having the optical power.

7. An interferometer according to claim 1, wherein the optical system has a positive optical power as the optical power.

* * * * *